Patented Feb. 11, 1941

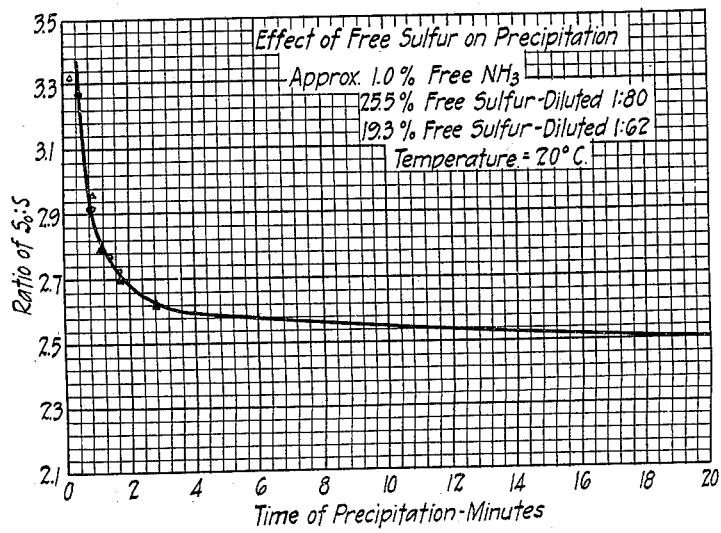
Fig. I
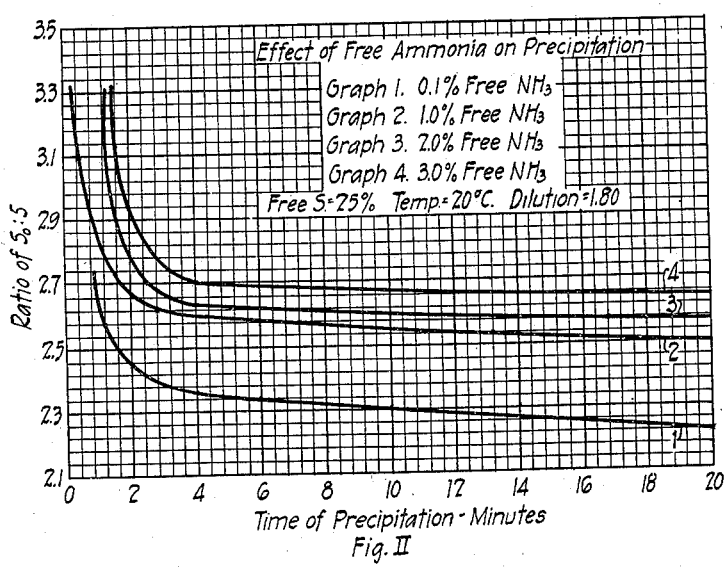
Fig. II
Inventors: F. A. Horsley
L. Rosenstein
By their Attorney:

2,231,423

UNITED STATES PATENT OFFICE 2,231,423

SPRAY FOR VEGETATION

Franz A. Horsley, Wilmington, and Ludwig Rosenstein, San Francisco, Calif., assignors to Shell Development Company, San Francisco, Calif., a corporation of Delaware Application December 5, 1939, Serial No. 307,660

5 Claims. (Cl. 167—14)

This invention relates in particular to sprays containing sulfur.

Ammonium polysulfide solutions have been known for a very long time but their use as commercial sprays, even though their excellent qualities have been recognized, have never reached any large proportion. The reason for this becomes clear when the usually described solutions of ammonium polysulfide are considered from the point of view of their practical use. Large scale commercial spraying is done by means of well-developed machinery consisting essentially of a tank mounted on a truck—said tank having a capacity of 300 or 400 gallons. This tank is equipped with a stirring device and with fine screens whose function it is to protect the spray nozzle. Mounted on the same truck is a pump capable of delivering the spray solution to fine nozzles at the end of a number of hoses at a pressure from about 300 lbs. per square inch upward. The concentrate of the material to be used is delivered to these spray rigs and is diluted in the above-mentioned tanks with the required amount of water. For continuous operation it is essential that the material used shall not contain or deposit any solid matter which may clog the spray nozzles, the screens, the pump valves or any other part of the equipment. When ammonium polysulfide of the composition generally described for laboratory or spray use is diluted with a large volume of water a precipitate and flocculation of sulfur is more or less rapidly formed. When a precipitate forms within the spray tank the spraying operation soon ceases due to the clogging of some part of the equipment with sulfur. The purpose of the present invention is to devise a concentrated solution of ammonium polysulfide of such composition that when said solution is largely diluted with water no sulfur will precipitate during the normal time of residence in the spray tank.

The concentrated solutions made according to the principles about to be described will remain clear of sulfur for over twenty minutes when diluted as much as eighty-fold with water, and the diluted solution has been found to be an effective insecticide and fungicide. The residence time of the diluted solutions within the spray tank is normally less than twenty minutes.

The active forms of sulfur present in a solution of ammonium polysulfide may be classified as follows:

1. Divalent sulfur—which is the sulfur arising from the reaction between hydrogen sulfide and ammonia to make ammonium sulfide.

2. Dissolved polysulfide sulfur which is that sulfur introduced as elementary sulfur and dissolved in the solution of ammonium sulfide. Such sulfur is sometimes referred to as free sulfur.

The solutions also contain certain amounts of free ammonia—meaning by this the quantity of ammonia in the solution over and above the formula $(NH_4)_2S$.

We have found that precipitation of colloidal sulfur does not take place within twenty minutes provided the ratio of free sulfur to divalent sulfur is kept within certain limits, said limits bearing a definite relation to the amount of free ammonia in the solution.

To show the effect of precipitation times on the ratio of divalent to polysulfide sulfur solutions were prepared which contained besides ammonium sulfide a small amount of free ammonia and also additional sulfur as polysulfide surfur. Such solutions were then diluted with water (the dilution being such that the concentration of polysulfide sufur in the diluted spray was about .31% in each case) and the time necessary for precipitation was noted. In Table I the percentage of polysulfide sulfur was 25.5, the percentage of free ammonia was 1% and the solution was diluted with eighty parts of water.

Table I

| Sample | $S^{--}$ | $S_0:S^{--}$ | Dilution ratio=1:80 minutes to ppt. sulfur 20° C. |
|---|---|---|---|
| 1 | 7.4 | 3.33 | 0.3 |
| 2 | 7.9 | 3.23 | 0.6 |
| 3 | 8.4 | 2.97 | 0.8 |
| 4 | 8.5 | 2.96 | 0.9 |
| 5 | 9.0 | 2.80 | 1.1 |
| 6 | 9.1 | 2.77 | 1.3 |
| 7 | 9.3 | 2.70 | 1.5 |
| 8 | 9.7 | 2.62 | 2.8 |
| 9 | 10.1 | 2.51 | 18 |
| 10 | 10.5 | 2.41 | 120 |

These data and those of Table II are plotted on Figure I of the attached drawing.

From the above, it will be noted that no sulfur is precipitated for 20 minutes on dilution if the ratio of polysulfide to divalent sulfur is less than 2.5 and the amount of free ammonia is at least 1%.

The experiment was then repeated with the exception that the percentage of polysulfide sulfur was made 19% and the solution was diluted with sixty-two parts of water.

Table II

| Sample | $S^{--}$ | $S_0:S^{--}$ | Dilution ratio=1:62 minutes to ppt. sulfur 20°C. |
|---|---|---|---|
| 1 | 6.5 | 2.92 | 0.8 |
| 2 | 6.8 | 2.81 | 1.1 |
| 3 | 7.0 | 2.72 | 1.7 |
| 4 | 7.9 | 2.43 | 30 |
| 5 | 8.4 | 2.24 | 120 |

From the above experimental data, it will be seen that the precipitation of sulfur from ammonium polysulfide solutions is independent of the absolute amount of polysulfide sulfur that the original solution contains, but depends rather on the ratio of the divalent to polysulfide sulfur and, as will be later seen, on the presence of free ammonia in the original solution.

It is also apparent from the above that if the ratio of polysulfide to divalent sulfur is not over 2.5 and at least 1% of free ammonia is present, the solution on dilution to a concentration of .31% of polysulfide sulfur will not precipitate sulfur for at least twenty minutes.

Figure II shows the effect of free ammonia on the precipitation time. Four curves are drawn showing the relation for four solutions of 25% free sulfur content and free ammonia content varying from 0.10% to 3.0%. The dilution is 80 parts water to one part solution. It will be seen that the presence of free ammonia has a stabilizing effect which is very marked when the concentration is increased from 0.10% free $NH_3$ to 1.0%, and further increments above about 3% have very little, if any, additional stabilizing effect. For example, a solution containing a ratio $$S^o/S^= = 2.5$$

will on dilution to 0.31% polysulfide sulfur begin to precipitate colloidal sulfur in about 1 minute when 0.10% free $NH_3$ is present, but this same solution will not show any precipitation for 20 minutes when 3% free $NH_3$ is present.

All the above percentages are by weight.

Thus while from the point of view of preventing premature flocculation of sulfur a relatively high content, i. e., more than about .1% of free ammonia is desirable, too high a concentration of free ammonia is liable to cause severe damage to the vegetation. For this reason the concentration of free ammonia should not exceed about 3%.

To prepare the concentrated ammonium polysulfide solutions according to this invention hydrogen sulfide is bubbled through concentrated aqua ammonia. When all of the ammonia present is reacted with the hydrogen sulfide from about 0.1 to 3.% of free ammonia is added to the solution and then sulfur is added to bring the ratio of polysulfide to divalent sulfur to about 2.5 to 1. The ammonia which is added does not react with the sulfur, but remains free and its presence as free ammonia can be shown by analysis. Instead of adding free ammonia to the substantially neutral ammonium sulfide solution it is possible to secure the same effect by not adding quite enough hydrogen sulfide to react with all of the ammonia.

One preferred composition of the concentrated solution which has been found effective as an insecticide and fungicide and also transportable in the concentrated form had the following analysis:

|  | Per cent by weight |
|---|---|
| Sulfide sulfur | 11 |
| Polysulfide sulfur | 26 |
| Free ammonia | 2 |

This solution will not precipitate sulfur for almost one hour when diluted with 80 volumes of water and the concentrated solution can be cooled to below 0° C. without crystallization.

For practical spraying conditions the ratio of polysulfide to divalent sulfur must be as high as possible. It has been found that those solutions having a ratio of less than 2.2 to 1 are not economically practical for insecticidal use due to their low polysulfide sulfur content.

The hydrogen sulfide used may be obtained from refinery waste gases by absorbing the same in ammonia solution. These gases contain beside hydrogen sulfide, ethane, ethylene, propane and traces of carbonyl sulfide as well as mercaptans.

In order that the polysulfide solution can be shipped in the smallest container possible per effective unit, it is desirable that the solution be as concentrated as possible. Therefore the amount of polysulfide sulfur in the solution should be from 10 to 30% by weight and is preferably over 19%.

This application is a continuation-in-part of our application Serial No. 171,090, filed October 26, 1937.

We claim as our invention:

1. An ammonium polysulfide solution suitable for use as an insecticide on dilution with water comprising ammonium sulfide containing divalent sulfur from .1 to 3% of free ammonia and additional sulfur as polysulfide sulfur, the ratio of the polysulfide sulfur to the divalent sulfur of the ammonium sulfide being from about 2.2:1 to 2.5:1, the said amount of free ammonia being sufficient to prevent the precipitation of sulfur for at least 20 minutes when the solution is diluted with water to a polysulfide sulfur content of about .31%.

2. The ammonium sulfide solution of claim 1 wherein the solution contains from 10 to 30% by weight polysulfide sulfur.

3. The ammonium sulfide solution of claim 1 wherein the solution contains at least 19% by weight of polysulfide sulfur.

4. An ammonium sulfide solution which can be diluted with up to 80 volumes of water without the precipitation of free sulfur within 20 minutes comprising ammonium sulfide, from .1 to 3% of free ammonia and sulfur as polysulfide sulfur, the ratio of the polysulfide sulfur to the divalent sulfur of the ammonium sulfide being from about 2.2:1 to 2.5:1 the said solution containing from 10 to 30% by weight of polysulfide sulfur.

5. The process for the manufacture of ammonium polysulfide solutions which are capable for use as spray for vegetation on dilution comprising reacting just sufficient hydrogen sulfide with aqueous ammonia to form an ammonium sulfide solution with all of said ammonia, dissolving free sulfur therein until the ratio of added sulfur to the sulfur in said ammonium sulfide is between 2.22 and 2.5 to 1, and adding at least 1% by weight of free ammonia, said amount of ammonia being sufficient to prevent the precipitation of free sulfur for at least 20 minutes on dilution with 80 volumes of water, said operations being carired out in such a manner as to produce a solution containing at least 19.3% of polysulfide sulfur.

FRANZ A. HORSLEY.
LUDWIG ROSENSTEIN.